(12) United States Patent
Weinberg et al.

(10) Patent No.: US 9,390,599 B2
(45) Date of Patent: Jul. 12, 2016

(54) NOISE-SENSITIVE ALERT PRESENTATION

(71) Applicant: Microsoft Technology Licensing, LLC, Redmond, WA (US)

(72) Inventors: Shira Weinberg, Herzeliya (IL); Guy Kashtan, Hertzlyia (IL); Benny Schlesinger, Ramat Hasharon (IL); Blaise Aguera y Arcas, Seattle, WA (US); Christina Summer Chen, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 3 days.

(21) Appl. No.: 14/281,437

(22) Filed: May 19, 2014

(65) Prior Publication Data

US 2015/0332564 A1   Nov. 19, 2015

(51) Int. Cl.
*H04B 3/36* (2006.01)
*G08B 6/00* (2006.01)
*G08B 3/10* (2006.01)
(Continued)

(52) U.S. Cl.
CPC .. *G08B 6/00* (2013.01); *G08B 3/10* (2013.01); *H04M 1/57* (2013.01); *H04M 1/72569* (2013.01); *H04M 19/044* (2013.01); *H04M 2250/12* (2013.01)

(58) Field of Classification Search
CPC ......... H04W 4/16; H04W 4/12; H04M 3/523; H04M 3/42
USPC .......... 340/407.1, 539.11, 691.6, 4.12, 815.4, 340/384.1; 455/550.1, 570
See application file for complete search history.

(56) References Cited

U.S. PATENT DOCUMENTS 6,185,296 B1   2/2001   Saitoh
7,248,885 B2   7/2007   Benco et al.
(Continued)

FOREIGN PATENT DOCUMENTS

DE   10003963 A1   8/2001
WO   03007474 A2   1/2003

OTHER PUBLICATIONS

"SenSay: A Context-Aware Mobile Phone", Daniel Siewiorek, Asim Smailagic, Junichi Furnkawa, Neema Moraveji, Kathryn Reiger and Jeremy Shaffer, Oct. 21, 2003, In Proceedings of the 7th IEEE International Symposium on Wearable Computers, 10 pgs.
(Continued)

*Primary Examiner* — Phung Nguyen
(74) *Attorney, Agent, or Firm* — Michael David Ream; Thomas S Wong; Sandip S Minhas

(57) ABSTRACT

Many devices are configured to present alerts notifying a user of device events, but the user may not notice the alert due to a noisy environment. A user may mitigate missed alerts by increasing the alert volume or choosing a vibration mode, but such techniques depend upon the knowledge, attention, and memory of the user to adjust the device before the alert. Instead, a device may compare the noise level of the environment with a noise level threshold. If the noise level is below the threshold, the device presents the alert; but if the noise level is above the threshold, the device defers the presentation of the alert until the noise level diminishes below the threshold, and then presents the alert. The device may also send an automated response to the message, notifying a sender that the user may return the message upon leaving the noisy environment.

16 Claims, 9 Drawing Sheets

(51) Int. Cl.
*H04M 1/57* (2006.01)
*H04M 1/725* (2006.01)
*H04M 19/04* (2006.01)

(56) References Cited

U.S. PATENT DOCUMENTS

| | | | |
|---|---|---|---|
| 7,333,604 | B2 | 2/2008 | Zernovizky et al. |
| 8,219,242 | B2 | 7/2012 | Kuo et al. |
| 8,660,616 | B1 * | 2/2014 | Chhaunker ......... H04M 1/6505 379/179 |
| 2002/0076033 | A1 | 6/2002 | Baweja et al. |
| 2003/0008687 | A1 | 1/2003 | Nishimura |
| 2004/0082317 | A1 | 4/2004 | Graefen |
| 2004/0127198 | A1 | 7/2004 | Roskind et al. |
| 2004/0259536 | A1 | 12/2004 | Keskar et al. |
| 2005/0250551 | A1 | 11/2005 | Helle |
| 2006/0016896 | A1 | 1/2006 | Grupp |
| 2006/0141926 | A1 | 6/2006 | Anttillo et al. |
| 2008/0070640 | A1 | 3/2008 | Shin |
| 2008/0132290 | A1 * | 6/2008 | Sharabi ............. H04M 1/72519 455/567 |
| 2010/0083255 | A1 | 4/2010 | Bane et al. |
| 2011/0077033 | A1 | 3/2011 | Shuai |
| 2012/0276932 | A1 * | 11/2012 | Ferren ................ G02B 13/0065 455/456.6 |
| 2013/0012246 | A1 | 1/2013 | Gilson |
| 2014/0051404 | A1 | 2/2014 | Chhaunker et al. |

OTHER PUBLICATIONS

"International Search Report & Written Opinion Issued in PCT Patent Application No. PCT/US2015/031266", Mailed Date: Dec. 14, 2015, 28 Pages.

* cited by examiner

NOISE-SENSITIVE ALERT PRESENTATION

BACKGROUND

Within the field of computing, many scenarios involve the presentation of an alert on a device, such as a ringtone or vibration presented to a user by a mobile phone upon receiving an incoming call or text message. In such scenarios, the noise of the environment may affect the user's ability to hear the alert, which may cause the user to miss a time-sensitive alert, such as a request for a realtime communication session (e.g., an incoming phone call or video chat request). The user may utilize a variety of techniques to cope with the noise of the environment, such as increasing the volume of the device to make the alert noticeable over the noise of the environment. If the noise in the environment is of a particular type, the user may switch the alert of the device from a first sensory modality that matches the noise to an alternative sensory modality that does not match the noise (e.g., in an environment with a loud volume of sound, the user may switch from a sound-based alert to a vibration-based alert). If the user misses the alert, the device may log the missed alert and present a message that the user may notice during or after the time of the alert.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While the techniques described above may enable a user to mitigate the noise of the environment in the context of presented alerts, these techniques may present a few disadvantages. For example, mitigation techniques that involve the attention of the user may be inadequate, as the user may have limited attention for managing the device, or limited patience in adapting the volume of the device a changing noise level of the environment. Additionally, techniques such as increasing the volume of a ringtone may be unpleasant (e.g., in a noisy environment, a ringtone that is loud enough to overcome the noise level may also irritate other individuals), and may be embarrassing if the user fails to reset it when the noise level subsides (e.g., a very loud ringtone that is audible in a noisy environment may be piercing if the user transitions to a quiet environment).

As another example, even if the user receives the alert from the device, the user may not be able to respond due to the noise level; e.g., the user may not wish to accept a call in a noisy environment when the user and the caller would be unable to hear one another. Moreover, unless the user informs the caller of why the user is unable to accept the call (e.g., by sending a text message), the caller is uninformed of the reason for the missed call.

Presented herein are techniques for configuring a device to present alerts that is sensitive to the noise level of the environment. In accordance with these techniques, when a device is to present an alert to a user, the device detects the noise level of the environment, and compares the noise level with a noise level threshold. If the noise level is below the noise level threshold (i.e., if the environment is sufficiently quiet for the user to receive the alert), the device presents the alert to the user. However, if the noise level is above the noise level threshold (i.e., if the environment is too noisy for the user to receive the alert), the device refrains from presenting the alert, and instead defers the presentation of the alert until the device detects that the noise level has subsided below the noise level threshold. Optionally, for an alert involving a caller, the device may automatically send a message to the caller regarding the noise level, e.g., notifying the caller that the user is unable to take a call due to a noisy environment. By refraining from presenting alerts in noisy environments when the user is unlikely to receive the alert, the device may more conveniently interact with the user in a context-aware manner in accordance with the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
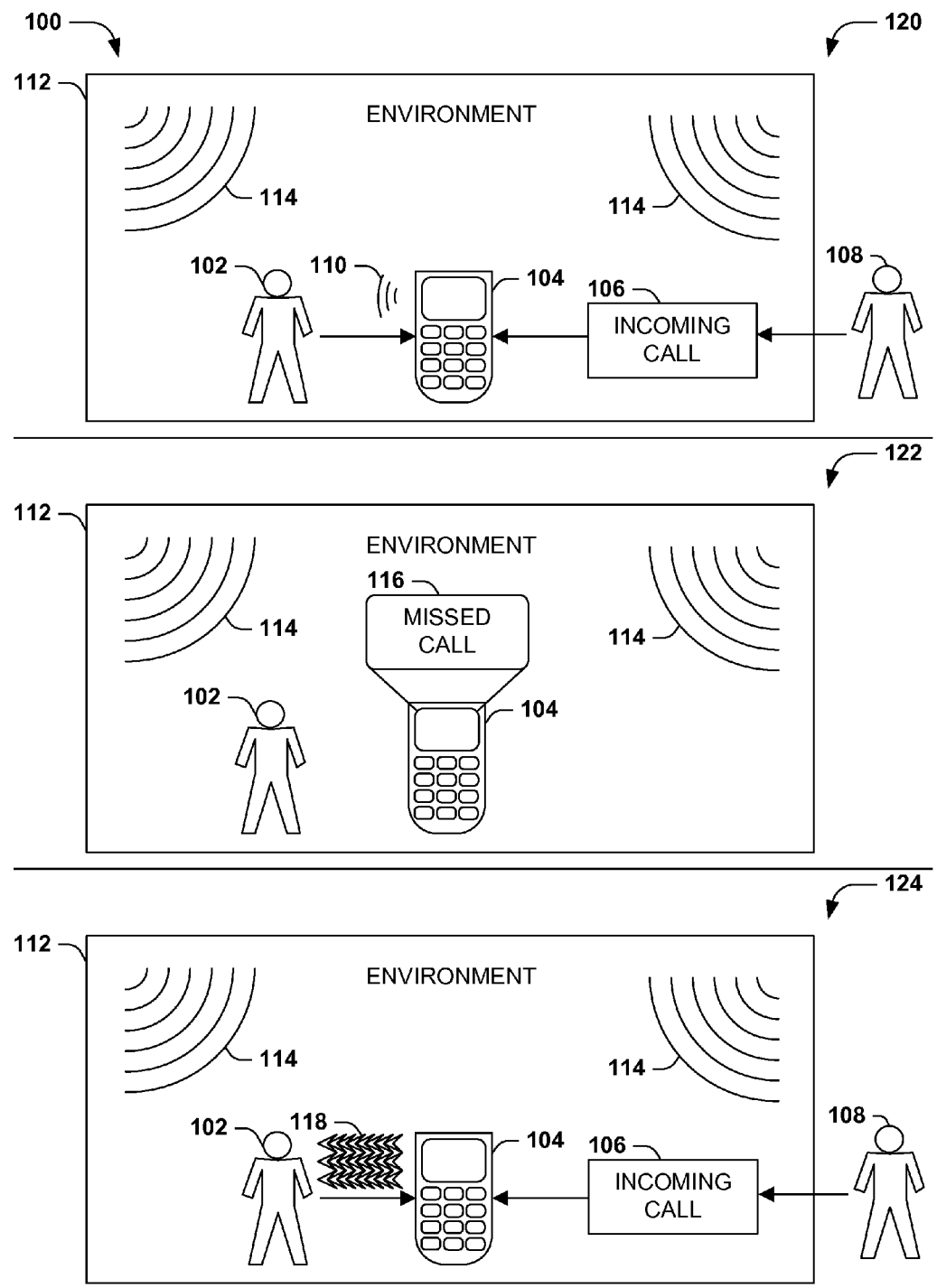
FIG. 1 is an illustration of an exemplary scenario featuring various techniques for presenting an alert to a user of a device.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

FIG. 1 is an illustration of an exemplary scenario 100 featuring a presentation of an alert 110 to a user 102 of a device 104. In this exemplary scenario 100, the device 104 comprises a mobile phone that presents an alert 110 upon receiving an incoming call 106 from a contact 108 of the user 102. However, at a first time 120, the user 102 may be present in an environment 112 having a significant amount of noise 114 that may obscure the alert 110. As a first example, the alert 110 may comprise a sound that the user 102 may not hear due to the sound within a loud environment 112, such as a music concert or a public restaurant with a heavy volume of conversation. As a second example, the alert 110 may comprise a vibration that the user 102 may not perceive due to a significant amount of vibration within the environment 112, such as a train traveling over a rough track, or a bus traveling upon a cobblestone street. In these and similar scenarios, the alert 110 presented by the device 104 may not be perceived by the user 102 due to the noise 114 of the environment 112, and the contact 108 is eventually notified that the user 102 is unavailable.

Devices 104 are often configured to mitigate such circumstances in a variety of ways. As a first example, the user 102 may simply increase the volume of the alert 110 in order to overcome the noise 114 of the environment 112. As a second example, the device 104 may present to the user 102 a notification 116 regarding the missed alert 110, which the user 102 may notice and respond to at a second time 122. As a third example, in anticipation of missing the alert 110 due to the noise 114 of the environment 112, the user 102 may toggle the presentation of alerts 110 by the device 104, switching from a first alert type that corresponds to the noise 114 to a second alert type that does not correspond to the noise 114 (e.g., switching from an audio alert 110 to a vibrational alert 118, which may be more readily perceived in an environment 112 featuring a high volume of sound noise 114 but a lower volume of vibration noise 114). Thereafter, at a second time 124, an alert 118 such as an incoming call 106 is presented as a vibrational alert 118 that is perceived by the user 102 in spite of the sound noise 114 of the environment 112.

While the techniques presented in the exemplary scenario 100 of FIG. 1 may enable the user 102 to mitigate the missed perception of alerts 110, such techniques may exhibit a variety of disadvantages.

As a first example, mitigation techniques such as raising the volume or switching to a different alert modality are implemented by the user 102. However, the user 102 may be unable to reach the device 104 to alter the settings in response (e.g., if the device 104 is in the user's pocket or bag); may not have available attention to manage the alert settings of the device 104 (e.g., while the user 102 is operating a vehicle); may not want to spend time change the settings; or may not understand how to change the setting. Additionally, in some scenarios, the user 102 may incorrectly believe that the alert 110 is perceivable over the noise 114 of the environment 112.

As a second example, techniques involving raising the volume of an alert (e.g., the volume of a broadcast audio alert, or the vibration strength of a vibrational alert 118) may overcome the noise 114 of the environment 112, but may also result in an unpleasant experience for the user 102 and/or other nearby individuals; e.g., an overly loud ringtone broadcast over a noisy conversation may be readily perceived by the user 102, but may also irritate others in the vicinity. Additionally, increasing the volume of the alert 110 may deplete the battery of the device 104 faster (e.g., generating a stronger vibration may result in a faster rate of energy drain for the device 104).

As a third example, mitigation techniques that involve altering the volume of the alert 110 to adapt to the noise 114 of the environment 112 may have undesirable consequences when the noise 114 of the environment 114 changes. For example, a user 102 may increase the volume of a ringtone when the environment 112 is noisy, but forgets to turn the volume back down when the volume subsides or when the user 102 transitions to a quieter environment 112. The resulting ringtone may be piercing, and may be embarrassing for the user 102 and irritating for others in the vicinity. Conversely, the user 102 may turn the alert volume of the device 104 down when present in an environment 112 with little noise, such as a library, but may not remember to restore the alert volume to a typical setting upon transitioning to an environment 112 with a typical noise level, and may therefore miss alerts 110 due to the unusually low volume of the alert 110. Moreover, the user 102 may simply be unwilling to attend to the volume level of the device 104 frequently as the noise 114 of the environment 112 changes.

As a fourth example, some devices 104 may only have one type of alert 110, or only various types of alerts that are each obscured by the noise 114 of the environment 112 (e.g., a mobile phone may have both an audio ringtone and a vibration module, but the user 102 may be present in an environment 112 that is both too loud to hear the audio ringtone and too rough to feel a vibration alert). Thus, the device 104 may be incapable of presenting any type of alert 112 that the user 102 is capable of perceiving over the noise 114 of the environment 112.

As a fifth example, presenting a notification 116 to the user 102 of a missed alert 110, such as a displayed message on a display of the device 104, may be insufficient to bring the missed alert 110 to the attention of the user 102. For example, a user 102 who is not anticipating an alert (such as receiving a call 106) may not check the device 104 for such a notification 116, and may not notice the notification 116 until long after missing the alert 110. This result may arise because the device 104 does not prompt the attention of the user 102 at a later time, but responds in a passive manner that is only noticeable when the user 102 later initiates an interaction with the device 104.

As a sixth example, when the alert 110 involves a contact 108 such as an individual placing a call 106 to the user 102, the interaction of the device 104 with the user 102 may fail to inform the contact 108 of the interaction. For example, the contact 108 may wait while the device 104 attempts to present the alert 110 to the user 102, and may then inform the contact 108 that the user 102 is unavailable and/or transfer the contact 108 to a voicemail box. However, these responses may not inform the contact 108 as to why the user 102 is unavailable (i.e., because of the noise 114 of the environment 112), but only that the user 102 is unavailable. These and other disadvantages may arise from the missed alert mitigation techniques presented in the exemplary scenario 100 of FIG. 1.

B. Presented Techniques

Figure 2:
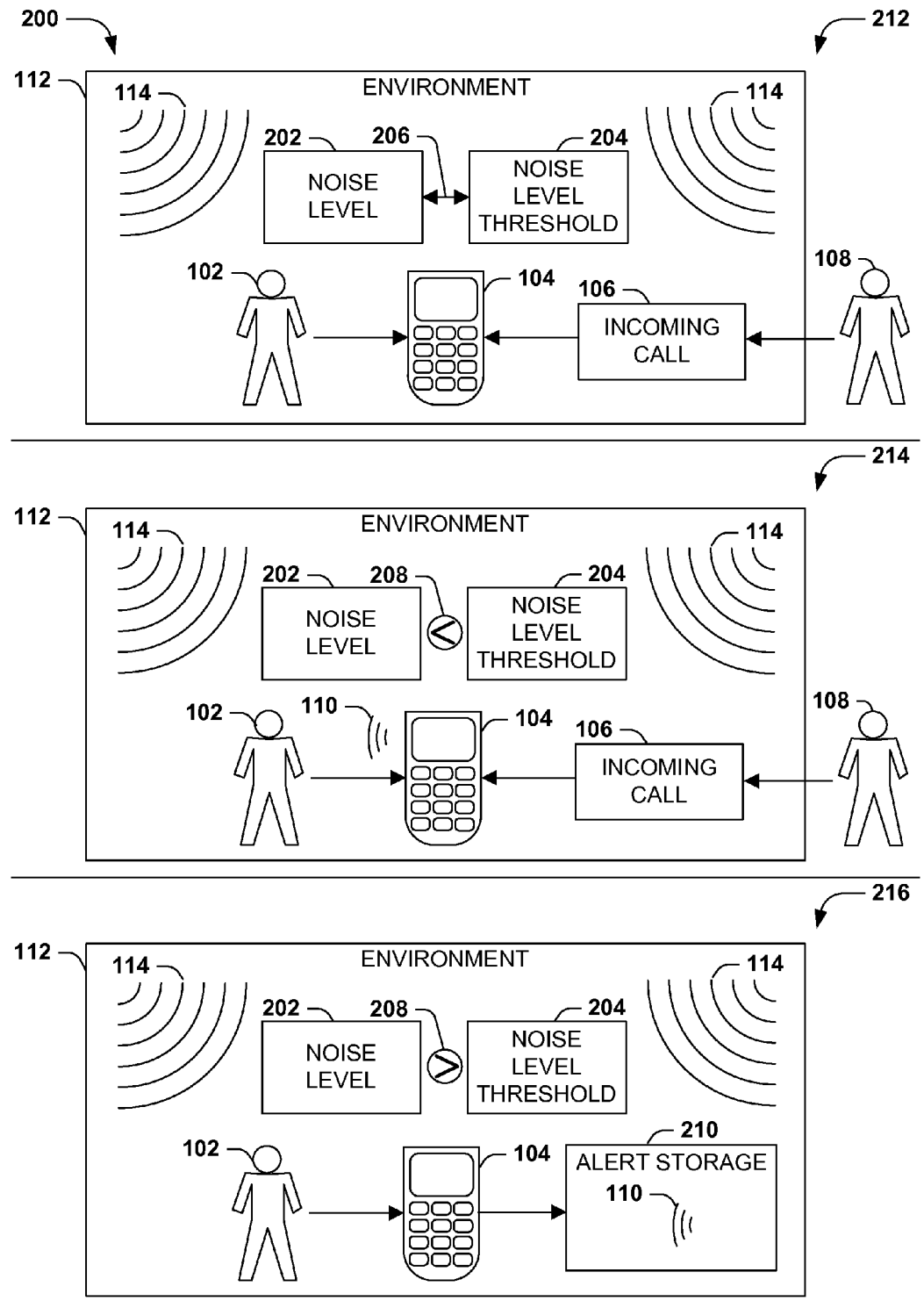
FIG. 2 is an illustration of an exemplary scenario featuring the presentation of an alert to a user of a device in accordance with the techniques presented herein.

FIG. 2 presents an illustration of an exemplary scenario 200 featuring a device 104 that is configured to present alerts 110 to a user 102 in view of the noise 114 of an environment 112 of the user 102 in accordance with the techniques presented herein.

In this exemplary scenario 200, at a first time 212, a device 104 of a user 102 receives a call 106 from a contact 108 of the user 102, and endeavors to present an alert 110 to the user 102 regarding the call 106. However, before presenting the alert 110, the device 104 measures a noise level 202 of the environment 112 of the user 102, and performs a comparison 206 of the noise level 202 of the noise 114 of the environment 112 with a noise level threshold 204 (e.g., determining whether the sound level of the environment 112 is above or below a sound level threshold, such as 65 decibels, or the peak loudness of a typical level of conversation). Upon reaching a determination 208 that the noise level 202 is below the noise level threshold 204, the device 104 may present 214 the alert 110 to the user 102 as an indication of the call 106 from the contact 108. However, upon reaching a determination 208 that the noise level 202 exceeds the noise level threshold 204, the device 104 may refrain from presenting the alert 110 to the user 102, and may instead store 216 the alert 110 in an alert storage 210 (e.g., a memory buffer for missed alerts 110). At a later time, when the device 104 reaches a determination 208 that the noise level 202 has diminished below the noise level threshold 204, the device 104 may present the alerts 110 in the alert storage 210 to the user 102 (e.g., providing an audio notification to the user 102 indicating the missed call 106 from the contact 108).

C. Technical Effects

The configuration of a device 104 to present an alert in accordance with the techniques presented herein, such as illustrated in the exemplary scenario 200 of FIG. 2, may present a variety of technical effects as compared with other techniques, including those illustrated in the exemplary scenario 100 of FIG. 1.

As a first example, the comparison 206 of the noise level 202 and the noise level threshold 204, and determination 208 of whether to present the alert 110 or to defer such presentation until the noise level 202 of the environment 112 subsides, are performed automatically by the device 104, and do not involve the knowledge, attention, and memory of the user 102 to adjust the operation of the device 104. As such, the techniques are less prone to consequences due to the failure of the user 102 to adjust the device 104 to the current environment 112 or the resetting of the device 104 when leaving the environment 112.

As a second example, the deferral of the presentation of the alert 110 until a time when the alert 110 is perceptible by the user 102, rather than overcoming the noise level 202 by increasing the volume of the alert 110, reduces the unpleasantness of presenting an amplified alert 110 to the user 102 and other individuals.

As a third example, the determination 208 not to present an alert 110 that is unlikely to be perceived by the user 102 may conserve the battery power and other computational resources of the device 104.

As a fourth example, the deferral of the presentation of the alert 110 to a subsequent time, and the actual presentation of the alert 110 at a later time when the noise level 202 diminishes below the noise level threshold 204, enables the device 104 to actively alert the user 102, rather than passively presenting a notification such as a message that the user 102 may not notice.

As a fifth example, the comparison 208 may be performed rapidly and may enable a prompt response to a contact 108 (rather than the contact 108 having to wait while the device 104 attempts in vain to alert the user 102), and/or may inform the contact 108 of the reason that the user 102 is unavailable, i.e., due to the noise level 202 of the environment 112. These and other technical effects may be achieved through the presentation of an alert 110 in view of the noise level 202 of the environment 112 may be achieved through the implementation of the techniques presented herein.

D. Exemplary Embodiments

Figure 3:
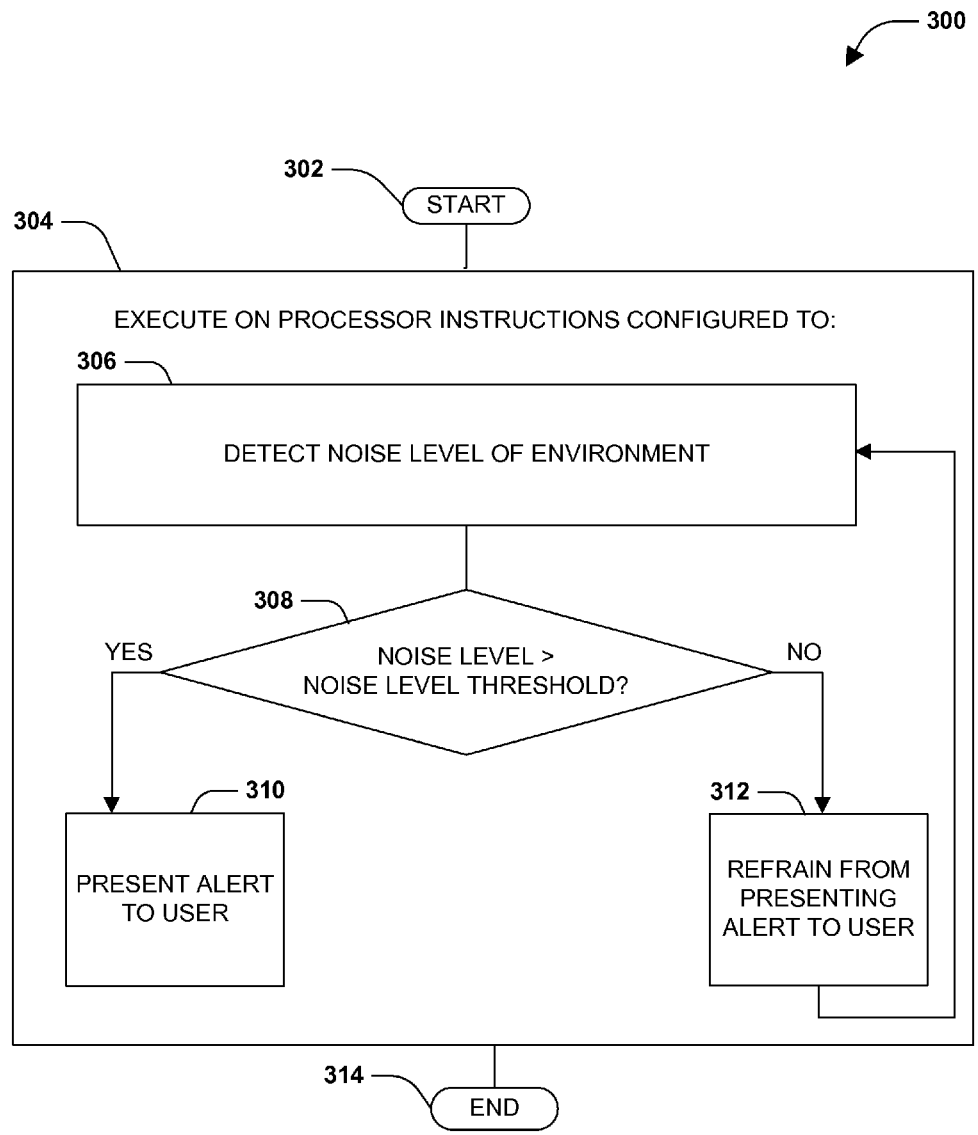
FIG. 3 is an illustration of a first exemplary method of presenting an alert to a user of a device in accordance with the techniques presented herein.

FIG. 3 presents an illustration of an exemplary first embodiment of the techniques presented herein, illustrated as an exemplary method 300 of presenting an alert 110 to a user 102 of a device 104. The exemplary method 300 may be implemented, e.g., as a set of instructions stored in a memory component (e.g., a memory circuit, a platter of a hard disk drive, a solid-state storage device, or a magnetic or optical disc) of a device having a processor, where the instructions, when executed on the processor, cause the device to operate according to the techniques presented herein. The exemplary method 300 begins at 302 and involves executing 304 the instructions on the processor of the device 104. In particular, the execution of the instructions on the processor causes the device 104 to detect 306 a noise level 202 of the environment 112, and compare 308 the noise level 202 of the environment 112 to a noise level threshold 204. If the noise level 202 is below the noise level threshold 204, the device 104 may present 310 the alert 110 to the user 112; but if the noise level 112 is above the noise level threshold 114, the device may refrain 312 from presenting the alert 110 to the user 102. Instead, the device 104 may again (after a brief period) detect 306 the noise level 202 of the environment 204 for comparison with the noise level threshold 204, and may continue to do so until the noise level 202 is below the noise level threshold 204, at which later time the device 104 may present the alert 110 to the user 102. By presenting the alert 110 to the user 102 in this manner, the execution of the instructions on the processor causes the device to operate in accordance with the techniques presented herein, and so the exemplary method 300 ends at 314.

Figure 4:
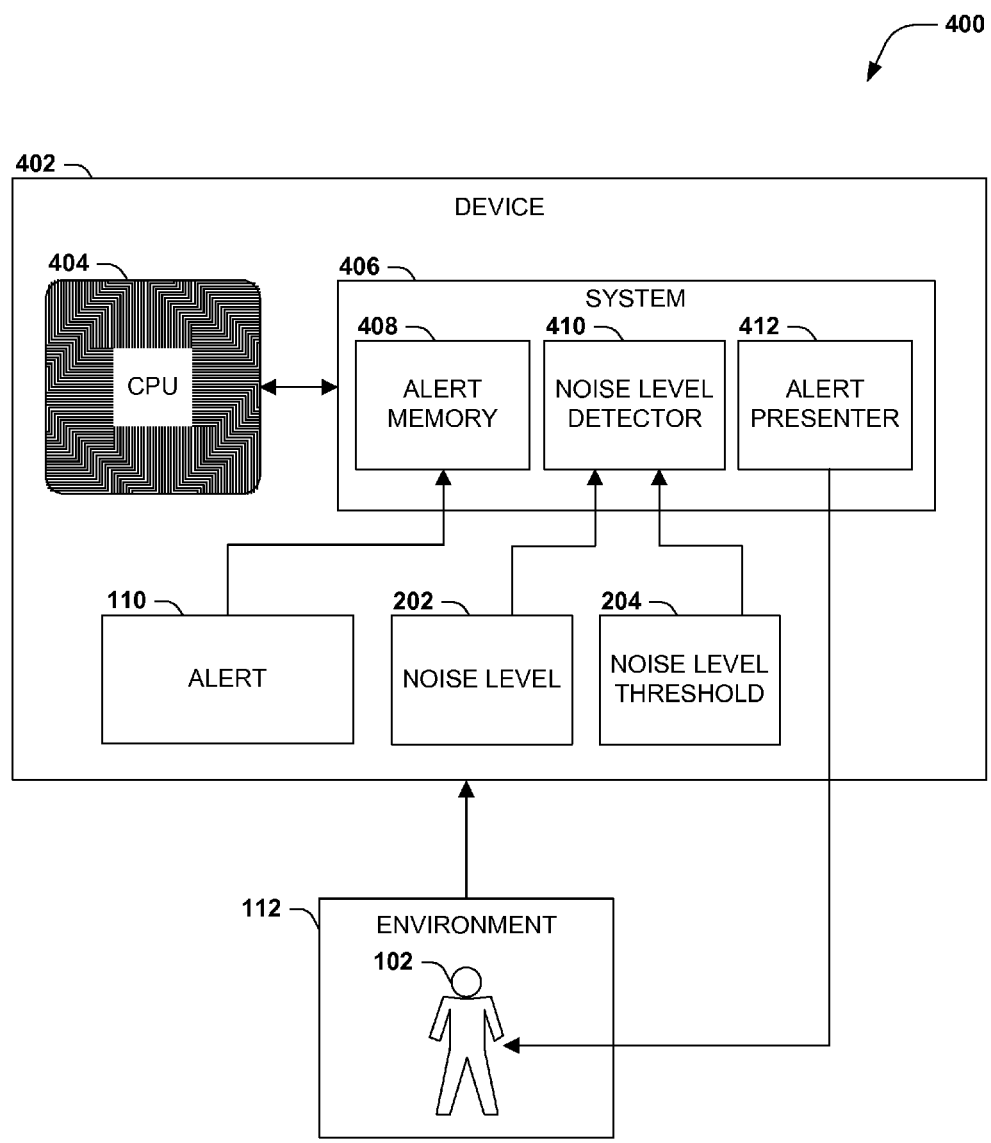
FIG. 4 is a component block diagram illustrating an exemplary device featuring an exemplary system for presenting an alert to a user in accordance with the techniques presented herein.

FIG. 4 presents an illustration of a second exemplary embodiment of the techniques presented herein, illustrated as an exemplary device 402 upon which is implemented an exemplary system 406 for presenting alerts 110 to a user 102. The respective components of the exemplary system 406 may be implemented, e.g., as instructions stored in a memory component of the exemplary device 402 that, when executed on a processor 404 of the exemplary device 402, cause the exemplary device 402 to perform at least a portion of the techniques presented herein. Alternatively (though not shown), one or more components of the exemplary system 406 may be implemented, e.g., as a volatile or nonvolatile logical circuit, such as a particularly designed semiconductor-on-a-chip (SoC) or a configuration of a field-programmable gate array (FPGA), that performs at least a portion of the techniques presented herein, such that the interoperation of the components completes the performance of a variant of the techniques presented herein.

The exemplary system 406 includes an alert memory 408 that, upon receiving an alert 110, stores the alert 110. The exemplary system 406 also includes a noise level detector 410 (e.g., a microphone or a vibration sensor) that detects a noise level 202 of the environment 112 of the user 102. The exemplary system 406 also includes an alert presenter 412 that, while the alert memory 408 stores at least one stored alert 110, compares the noise level 202 of the environment 112 of the user 102 to a noise level threshold 204. Upon determining that the noise level 202 of the environment 112 of the user 102 is below the noise level threshold 204, the alert presenter 412 presents the at least one stored alert 110 to the user 102, and removes the at least one stored alert 110 from the alert memory 408. In this manner, the architecture and interoperation of the components of the exemplary system 406 of FIG. 4 enable the exemplary device 402 to present alerts 110 to the user 102 in accordance with the techniques presented herein.

Still another embodiment involves a computer-readable medium comprising processor-executable instructions configured to apply the techniques presented herein. Such computer-readable media may include, e.g., computer-readable storage devices involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage devices) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 5:
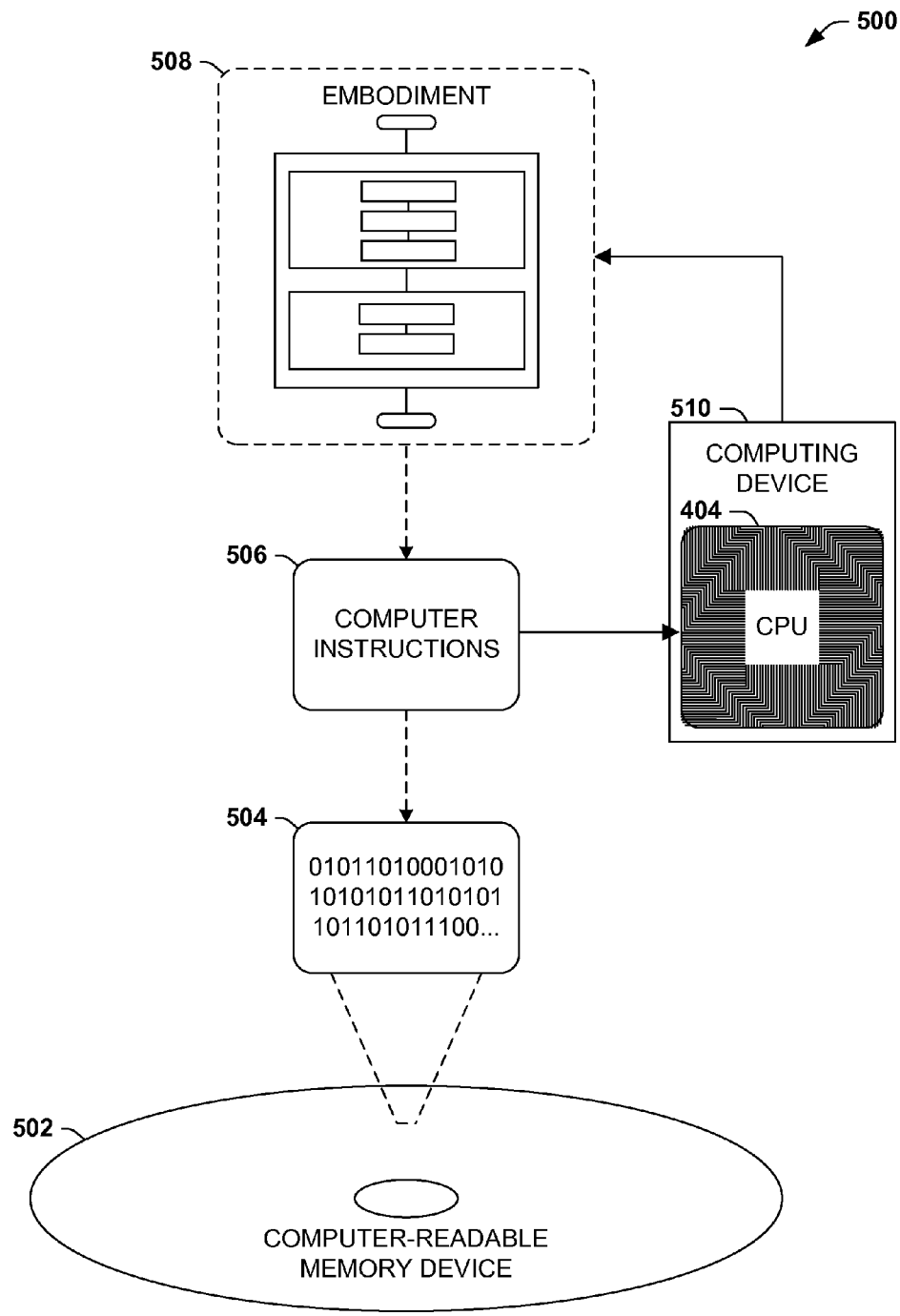
FIG. 5 is an illustration of an exemplary computer-readable medium including processor-executable instructions configured to embody one or more of the provisions set forth herein.

An exemplary computer-readable medium that may be devised in these ways is illustrated in FIG. 5, wherein the implementation 500 comprises a computer-readable memory device 502 (e.g., a CD-R, DVD-R, or a platter of a hard disk drive), on which is encoded computer-readable data 504. This computer-readable data 504 in turn comprises a set of computer instructions 506 that are configured to operate according to the principles set forth herein. In a first such embodiment, the processor-executable instructions 506 may be configured to cause a device to perform a method of presenting alerts 110 to a user 102, such as the exemplary method 300 of FIG. 3. In a second such embodiment, the processor-executable instructions 506 may be configured to implement one or more components of a system for presenting alerts 110 to a user 102, such as the exemplary system 406 in the exemplary device 402 of FIG. 4. Many such computer-readable media may be devised by those of ordinary skill in the art that are configured to operate in accordance with the techniques presented herein.

E. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 300 of FIG. 3; the exemplary system 406 of FIG. 4; and the exemplary computer-readable memory device 502 of FIG. 5) to confer individual and/or synergistic advantages upon such embodiments.

E1. Scenarios

A first aspect that may vary among embodiments of these techniques relates to the scenarios wherein such techniques may be utilized.

As a first variation of this first aspect, the techniques presented herein may be utilized in a variety of devices 104, such as laptops, tablets, phones and other communication devices, headsets, earpieces, eyewear, wristwatches, portable gaming devices, portable media players such as televisions and music players, mobile navigation devices, mobile appliances, and vehicles.

Figure 6:
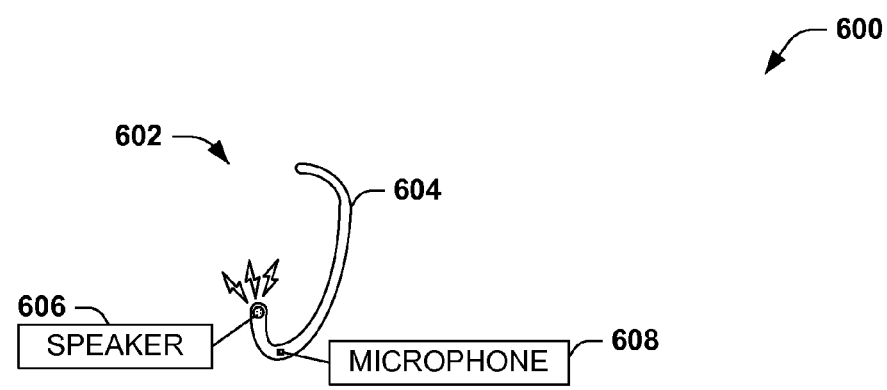
FIG. 6 is an illustration of an exemplary device wherein the techniques presented herein may be implemented.
Figure 6:
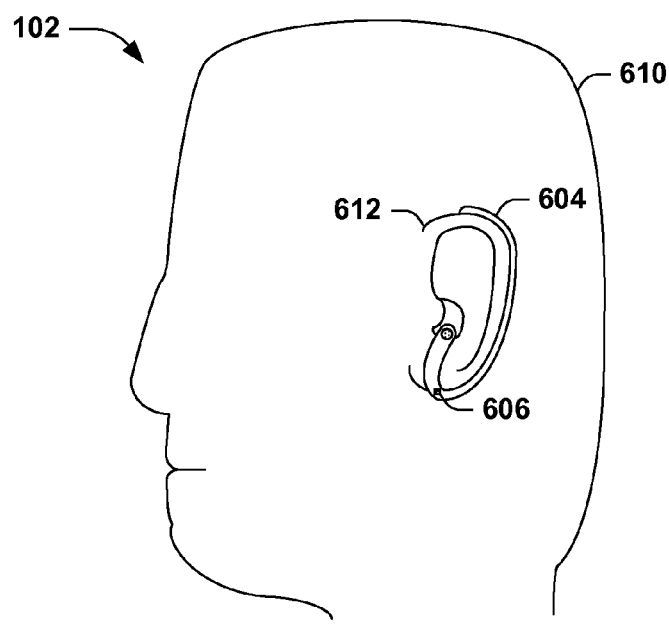

FIG. 6 is an illustration of an exemplary scenario 600 featuring one such device, comprising an earpiece device 602 comprising a housing 604 wearable on an ear 614 of a head 612 of a user 102, and comprising a speaker 606 positionable near the ear 614 of the user 102 and a microphone 608. In order to present an alert 110 to the user 102, the earpiece device 602 may utilize the microphone 608 to detect the noise level 202 of the environment 112 of the user 102, and may compare the noise level 202 with a noise level threshold 204 (e.g., a maximum level of noise 114 wherein an alert presented through the speaker 606 is likely to be comfortably audible to the user 102). If the microphone 608 determines that noise level 202 is below the noise level threshold 204, the earpiece device 602 may present the alert 110 the user 102 through the speaker 606; but if the noise level 202 is determined to exceed the noise level threshold 204, the earpiece device 602 may defer the presentation of the alert 110 to the user 102 until the noise level 202 is reduced below the noise level threshold 204. Upon detecting such reduction, the earpiece device 604 may use the speaker 606 to present the alerts 110 to the user 102 (e.g., informing the user 102 of the alerts 110 missed during the period of high noise level 202) in accordance with the techniques presented herein.

As a second variation of this first aspect, the techniques presented herein may be utilized to present alerts 110 having many types of meaning, such as the receipt of an incoming call 106 or an incoming message; the presence or availability of another individual; the receipt of a warning, such as a weather, traffic, or news alert; an informational bulletin or update of a software application; a cue pertaining to the environment 112 of the user 102, such as a directional message from a navigation device; and the completion of a task on the device, such as the delivery of a message to another individual.

As a third variation of this first aspect, the techniques presented herein may be used with many physical types of alerts 110, and the comparison of a corresponding noise level 202 of the environment 112 with a noise level threshold 204. As a first example, the alert 110 may comprise an audio alert, such as a tone, music sample, voice recording, or synthesized voice expression, and the noise 114 of the environment 112 may be measured by a microphone 608 as a sound volume, e.g., a decibel measurement. As a second example, the alert 110 may comprise a vibration, and the noise level 202 may be measured by a vibration sensor according to the vibration of the environment (e.g., the magnitude of vibration experienced by the user 102). As a third example, the alert 110 may comprise a visual alert, such as a light-emitting diode or a backlit display of a device, and the noise may be measured as the ambient light of the environment 112 (e.g., a visual display may be imperceptible due to glare produced by the sun on a bright day). As a fourth example, the alert 110 may comprise pressure or force, and the noise of the environment may be measured as the pressure or force exerted by the environment 112 on the user 102 (e.g., a ring device worn on a finger may present an alert 110 by squeezing the finger of the user 102, but this alert 110 may be imperceptible if the user 102 is currently engaged in physical activity that also exerts force on the hands of the user 102, such as swimming). As a fifth example, the alert 110 may comprise a change in temperature applied to the skin of the user 102, and the noise level 202 of the environment 112 may be measured as the temperature of the environment 112 (e.g., a ring device may heat up to convey an alert 110, but may be imperceptible if the user's hands are already overly warm). These and other scenarios may be suitable for application of the techniques presented herein.

E2. Detecting Noise Level

A second aspect that may vary among embodiments of the techniques presented herein involves the manner of detecting the noise level 202 of the environment 112 for comparison with a noise level threshold 204.

As a first variation of this second aspect, the device 104 may detect the noise level 202 of the environment 112 upon receiving a request to present an alert 110 to the user 102 (e.g., only while an alert memory 408 stores at least one stored alert 110). This variation may be advantageous, e.g., by conserving the battery power and computational resources of the device 104.

As a second variation of this second aspect, the device 104 may periodically detect the noise level 202 of the environment 112 of the user 102, and may periodically compare the last detected noise level 202 of the environment 112 with the noise level threshold 204. This variation may be advantageous, e.g., by having completed the noise level determination upon receiving the alert 110, enabling a more rapid response to the determination (e.g., the device 104 does not have to wait to sample the noise level 202 of the environment 112 before determining the handling of the alert 110). Additionally, sampling the noise level 202 periodically may provide a more accurate determination, e.g., based on the mean noise level 202 of the environment 112 over a period of time (such as ten seconds) rather than a comparatively instantaneous comparison that may not be as accurate.

As a further variation of this second aspect, the device 104 may detect the noise level 202 periodically in a different manner whether the environment 112 is currently detected to be noisy or quiet. For example, while the noise level 202 is below the noise level threshold 202, the device 104 may detect the noise level 202 at a first period duration; and while the noise level 202 is above the noise level threshold 204, the device 104 may detect the noise level 202 at a second period duration that is shorter than the first period duration. This variation may be selected, e.g., because determining that the device has transitioned from a noisy environment into a quiet environment, such that deferred alerts 110 may now be presented to the user 102, may represent a more significant determination than detecting than determining that the device 104 has transitioned from a quiet environment into a noisy environment, wherein new alerts 110 are simply to be deferred. Additionally, the period of each detection may be further adjusted based on other factors; e.g., if respective alerts 110 comprise an alert priority, then the period of duration of the second detection period (i.e., detecting when the device 104 has transitioned from a noisy environment to a quiet environment) may be adjusted in view of the alert priorities of stored alerts in an alert memory 408 (e.g., a short period duration may be selected if a high-priority alert 110 is stored, and a longer period duration may be selected if only lower-priority alerts 110 are stored).

Figure 7:
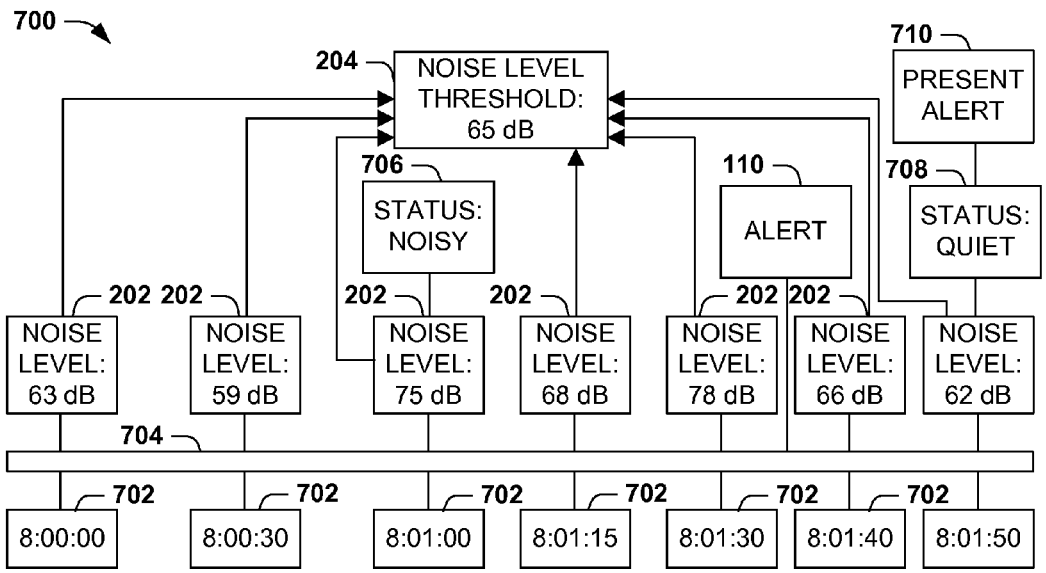
FIG. 7 is an illustration of an exemplary scenario featuring an adjustable timing of the detection of a noise level of an environment in accordance with the techniques presented herein.

FIG. 7 presents an illustration of an exemplary scenario 700 featuring several such variations of this second aspect. In this exemplary scenario 700, a device 104 performs the techniques presented herein (i.e., comparing the noise level 202 of an environment 112 of the user 102 to detect transitions between noisy and quiet environments) based on an adjustable period duration, reflected as a timeline 704 of times 702. At a first time 702, the device 104 may be present in a quiet environment where the noise level 202 is below a noise level threshold 204 of 64 decibels. The device 104 may therefore evaluate the noise level 202 of the environment 112 on a comparatively relaxed basis, such as 30-second intervals. At a later time 702, upon determining that the noise level 202 now exceeds the noise level threshold 204, the device 104 may identify a noisy environment status 706 of the environment 112, and reduce the period duration of the noise evaluation from thirty seconds to fifteen seconds. Even though the device 104 is not yet storing any deferred alerts 110, the device 104 may reduce the evaluation period duration in order to avoid deferring an alert 110 received shortly after the noise level 202 has reduced. At a still later time, the device 104 may receive an alert 110 to be presented to the user, but in view of the noisy environment status 706, the device 104 may store the alert 110. The device 104 may also further reduce the period duration, e.g., from fifteen seconds to ten seconds, in order to present the alert 110 to the user 102 as soon as possible. At a still later time, upon detecting that the noise level 202 has subsided below the noise level threshold 204, the device 104 may identify a quiet environment status 708 and may present 710 the stored alert 110 to the user 102.

As a third variation of this second aspect, the noise level threshold 204 may be selected by the user 102 (e.g., as a noise sensitivity slider that allows the user 102 to specify the sensitivity of the device 104 to noise 114 in relation to deferring received alerts 110). Alternatively or additionally, the noise level threshold 204 may be automatically determined for the user 102 by observing when the user 102 is consistently able to perceive an alert 110, and when the user 102 is consistently unable to perceive an alert 110. For example, an exemplary system 406 may include an alert response monitor that detects a user response of the user 102 to an alert 110 presented in the environment 112, and adjusts the noise level threshold 204 of the device 104 according to the user response of the user 102 to the alert 110. As one such scenario, the frequency spectrum may comprise a vibration frequency spectrum, and the alert 110 may comprises a vibration alert to be presented to the user 102 within a vibration frequency range. The device 104 may identify a noise level 202 of the environment 112 within the vibration frequency range of the alert 110, and compare the noise level 202 with the noise level threshold 204 in order to determine whether to present or defer the vibration alert 110.

Figure 8:
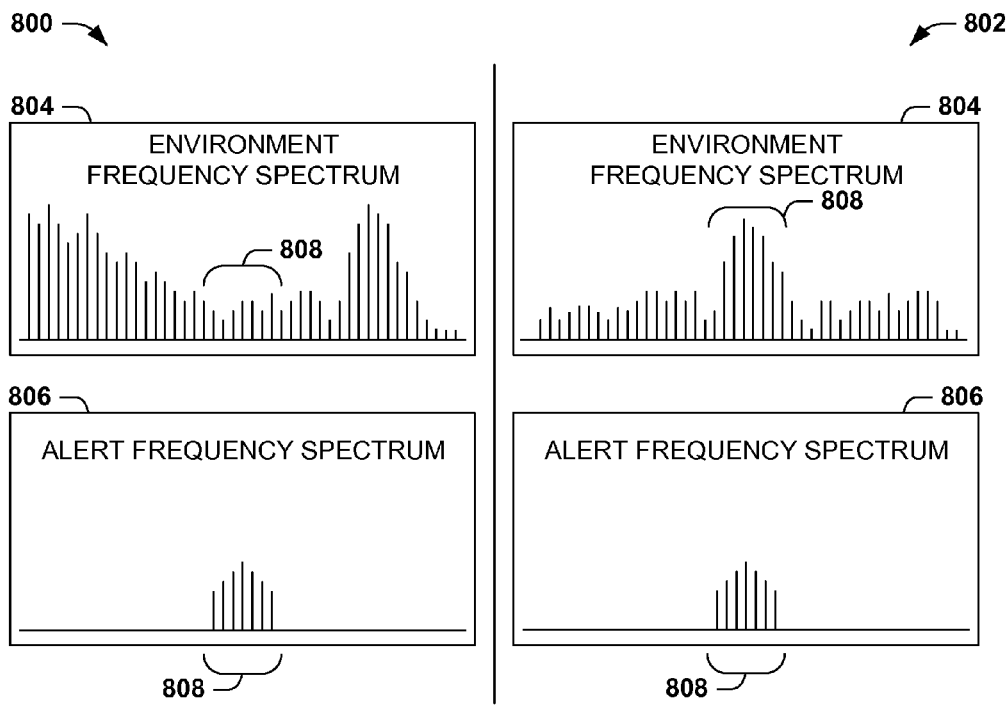
FIG. 8 is an illustration of an exemplary scenario featuring a comparison of a frequency spectrum of a noise level of an environment with a frequency spectrum of an alert in accordance with the techniques presented herein.

FIG. 8 presents an illustration of an exemplary scenario featuring a fourth variation of this second aspect, wherein the noise level 202 of the environment is evaluated only for a frequency range of the alert 110 within a frequency spectrum. As a first example 800, an alert 100 such as a ringtone may include musical notes within a particular frequency range 808 of a frequency spectrum 806 such as the audible sound spectrum. Even if the general noise level 202 of an environment 112 is comparatively high, the noise level 202 of the frequency range 808 of the environment frequency spectrum 804 may be comparatively low. In one such scenario, the noise 114 of the environment 112 may include a loud low-frequency rumbling and a high-pitched whine, such as in an airplane, but midrange tones within the spectrum of a ringtone may be comparatively diminished in the environment 112, such that the ringtone is still audible withstanding the otherwise high noise level 202 of the environment 112. Conversely, as a second example 802, the general noise level 202 of an environment 112 may be comparatively low, but may be particularly high in the frequency range 808 of the environment frequency spectrum 804 matching that of the alert 110, thereby rendering the alert 110 difficult to perceive. In one such scenario, the alert 110 may comprise human speech, and even a moderate amount of human speech present in the environment 112 in the same frequency range 808 may obscure the alert 110 despite an otherwise quiet noise level 202. Accordingly, a device 104 may identify the noise level 202 of the environment 112 only within the frequency range 808 of the alert 110, and may compare the noise level 202 only over the frequency range 808 with the noise level threshold 204. These and other variations may be included in the evaluation of the noise level 202 and comparison with the noise level threshold 204 in accordance with the techniques presented herein.

E3. Presenting and Deferring Alerts

A third aspect that may vary among embodiments of the techniques presented herein involves the response of the device 104 to the determination that the noise level 202 of the environment 112 exceeds the noise level threshold 204.

As a first variation of this third aspect, upon determining that the noise level 202 is above the noise level threshold 204 and in addition to deferring the presentation of the alert 110 to a later time when the noise level 202 subsides, the device 104 may present to the user 102 a notification of the alert 110 in another modality. For example, the device 104 may present a message on a display of the device 102 indicating that an alert 110 has been received during a noisy period, and has been deferred and stored for later presentation to the user 102.

As a second variation of this third aspect, upon determining that a first alert 110 is imperceptible to the user 102 in view of the noise level 202 of the environment 112, a device 104 may identify an alternative noise level 202 of the environment within the alternative frequency range of an alternative alert that is presentable to the user 102 at an alternative frequency range of the frequency spectrum that is different from the frequency spectrum of the first alert 110. The device 104 may then compare the alternative noise level 202 with the noise level threshold 204; and upon determining that the alternative noise level 202 is below the noise level threshold 204, present the alternative alert to the user 120 instead of the first alert 110.

Figure 9:
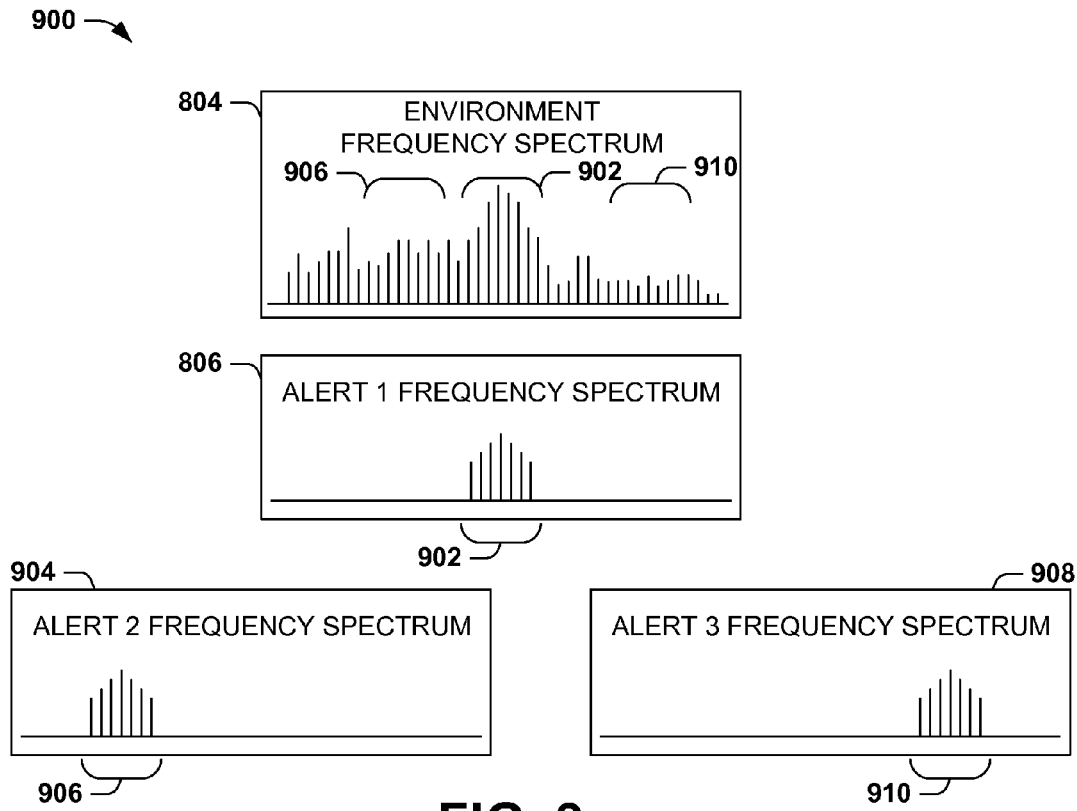
FIG. 9 is an illustration of an exemplary scenario featuring a set of alternative alerts presentable in an environment in accordance with the techniques presented herein.

FIG. 9 presents an illustration of an exemplary scenario 900 featuring this second variation of this third aspect, wherein the device 104 comprises a set of alerts 110 in a sensory modality (e.g., a set of audible sound alerts), but exhibiting a variety of frequency ranges 808 across a frequency spectrum 806 of the sensory modality. In this exemplary scenario 900, the device 104 may comprise a default alert 110 within a first frequency range 902 of the audible sound frequency spectrum 806 (e.g., a mid-pitch tonal sequence); a second alert 904 presented at a lower frequency range 906 within the audible sound frequency spectrum 806 (e.g., a low-pitch tonal sequence); and a third alert 908 presented at a higher frequency range 910 within the audible sound frequency spectrum 806 (e.g., a high-pitch tonal sequence). Upon determining that the noise level 202 of the environment frequency spectrum 804 within the first frequency spectrum 902 of the default alert 110 exceeds the noise level threshold 204, the device 104 may instead evaluate the noise levels 202 at the lower frequency range 906 and the higher frequency range 910 within the environment frequency spectrum 804. Upon determining that only the higher frequency range 910 exhibits a nose level 202 below the noise level threshold 204, the device 104 may present the third alert 908 in lieu of the default alert 110.

As a further example of this third variation of this second aspect, upon identifying identified a multitude of alerts 110 for which the frequency range 808 was below the noise level threshold 204, the device 104 may present a combination of such alerts 110 (e.g., a combination of tones that are individually perceptible over the noise level 202 in the respective frequency ranges 808, and that are even more readily perceptible when presented together, either concurrently or consecutively).

As a third variation of this fourth aspect, the device 104 may present an alternative alert in a different sensory modality (e.g., instead of presenting an audio alert 110 when the sound noise level 202 of the environment 112 is high, present a vibrational alert 118). For example, if the default alert 110 is provided in a first sensory modality, the device may present an alternative alert 110 in a second sensory modality that is different from the first sensory modality.

As a fourth variation of this third aspect, after deferring the presentation of an alert 110, the device 104 may store the alert 110 in an alert log, and may later present the alert log to the user 102. The alert log may comprise, e.g., simply an indication that one or more alerts 110 have been received (e.g., "while in a noisy area, you missed three calls"); a description of each alert 110, such as the names of contacts 108 initiating one or more missed calls 106; and/or a summary of the content of each alert 110, such as a recording or text transcript of voicemail messages left by each contact 108 who initiated a missed call 106.

Figure 10:
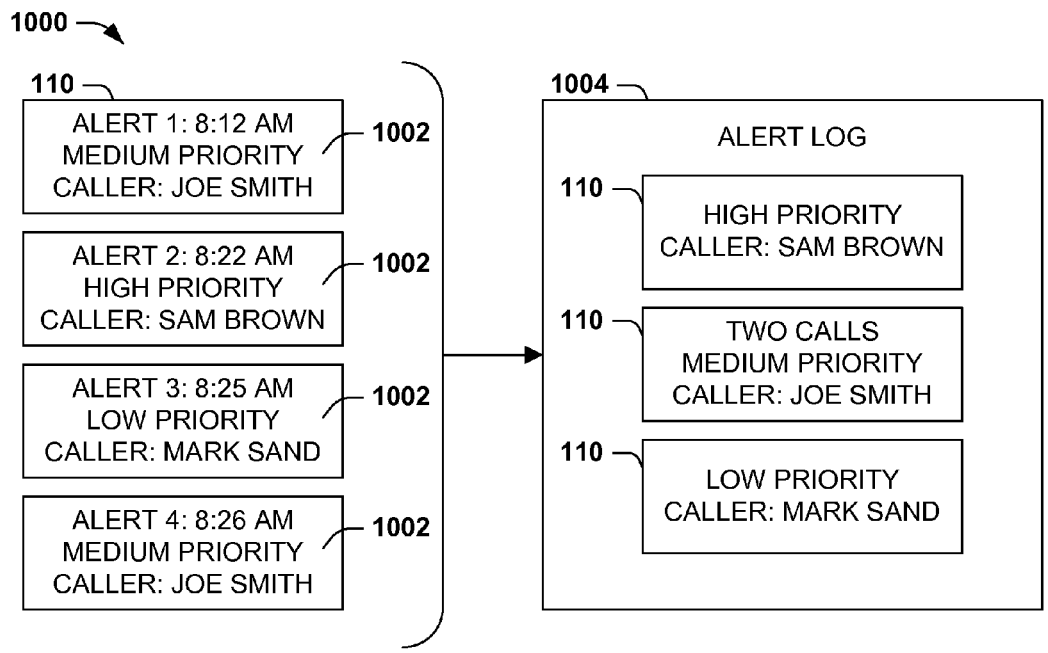
FIG. 10 is an illustration of an exemplary scenario featuring a presentation of an alert log of deferred alerts in accordance with the techniques presented herein.

FIG. 10 presents an illustration of an exemplary scenario 1000 featuring additional examples of this fourth variation of this third aspect involving an alert log 1004 indicating the alerts 1000 that were deferred due to the noise level 202 of the environment 112. In this exemplary scenario 1000, a set of alerts 110 are received that respectively include an alert priority 1002. The alert log 1004 may therefore present the alerts 110 sorted chronologically and/or descendingly by alert priority 1002 (e.g., presenting the highest-priority alerts 110 first). Additionally, where at least two alerts 110 are associated with a message, the alert log 1004 may consolidate the at least two alerts 110 that are associated with the same message 110 (e.g., consolidating two calls from the same individual as "missed two calls"). Such sorting and/or consolidation may be advantageous, e.g., for presenting the alerts in a manner that rapidly informs the user 102 of the alerts 110 deferred during the noisy environment, and may be particularly convenient for devices 104 that communicate with the user 102 through a dialogue interface, such as the earpiece device 602 in the exemplary scenario 600 of FIG. 6.

As a fifth variation of this third aspect, the device may attempt to present the alert 110 to the user despite the noise level 202 of the environment 112. For example, if the user happens to be looking at the device, the user may notice a visual indicator of the communication request even if the user is unable to hear an audio alert. Accordingly, the device may both present the alert 110 at the time of the communication request, and also defer the alert 110, if missed, for a subsequent time when the device detects that the noise level is below the noise level threshold. Moreover, the device may determine whether or not to present the alert 110 now based on the activity of the user; e.g., if the user is currently interacting with the device, then the device may present the alert 110 now despite the noise level 202 of the environment 112, and if the user is not currently interacting with the device, the device may defer the alert 110 until the noise level 202 is reduced. Many such variations in the response of a device 104 to the deferral of an alert 110 may be included in embodiments of the techniques presented herein.

E4. Communicating with Contacts

A fourth variation of the techniques presented herein involves the communication of the device with a contact whose request for a communication session with the user 102 is the source of an alarm 110. Where an alert 110 is associated with a contact 108, such as an individual initiating a communication request to initiate a communication session with the user 102, the device 104 may interact with the contact 108 in various ways upon deferring the alert 110 to the user.

As a first variation of this fourth aspect, the device 104 may decline the communication request, and may do so promptly upon determining the deferral of the alert 110, rather than after an extended delay while attempting to present the alert 110 to the user 102.

As a second variation of this fourth aspect, the device 104 may accept a message from the contact 108, such as a voicemail or text message, and may associate the message with the alert 110 for presentation to the user 102 in an alert log 1004.

As a third variation of this fourth aspect, the device 104 may provide an automated response that notifies the contact 108 that the user 102 is unavailable to accept the communication request due to the noise level 202 of the environment 112 of the user 102, thereby informing the contact 108 of the cause of the user's unavailability. In some embodiments, the automated response may be adjusted according to the contact (e.g., a first set of contacts may receive a first automated response containing information about the noisy environment, while a second set of contacts may receive a different automated response that only informs the contact of the user's intent to return the communication request at a later time).

As a fourth variation of this fourth aspect, the device 104 may inform the contact 108 that when the noise level 202 of the environment 112 diminishes below the noise level threshold 204, the device 104 shall present the alert 110 to the user 102, and/or may notify the contact 108 that the user 102 is now available.

As a fifth variation of this fourth aspect, the device 104 may present different messages to different contacts 108; e.g., close contacts 108, such as family members and friends of the user 102 may be notified that the user 102 is in a noisy environment, while more distant contacts 108 and unknown contacts 108 may be provided with a message that the user 102 is simply unavailable. Accordingly, the device 104 may, upon receiving from the user 102 at least two messages respectively deliverable to a contact 108 when the user 102 is unavailable to accept the communication request, store the messages respectively associated with a contact 108; and upon receiving a request from a contact 108 to establish a communication session, present to the contact 108 the message that is associated with the contact 108 when the user 102 is unavailable to accept the communication request.

As a sixth variation of this fourth aspect, the device 104 may limit the number of notifications sent to a particular contact 108. For example, if a contact 108 repeatedly attempts to contact the user 102, the device 104 may limit the presentation of messages informing the contact 108 of the status of the user 102 to a notification frequency threshold (e.g., a maximum of three messages per ten-minute block of time), and may refrain from notifying the contact 108 upon receiving further requests. Many such variations may be utilized in the communication of the device 104 with contacts 108 regarding the deferral of alerts 110 to the user 102 in accordance with the techniques presented herein.

F. Computing Environment

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments to confer individual and/or synergistic advantages upon such embodiments.

Figure 11:
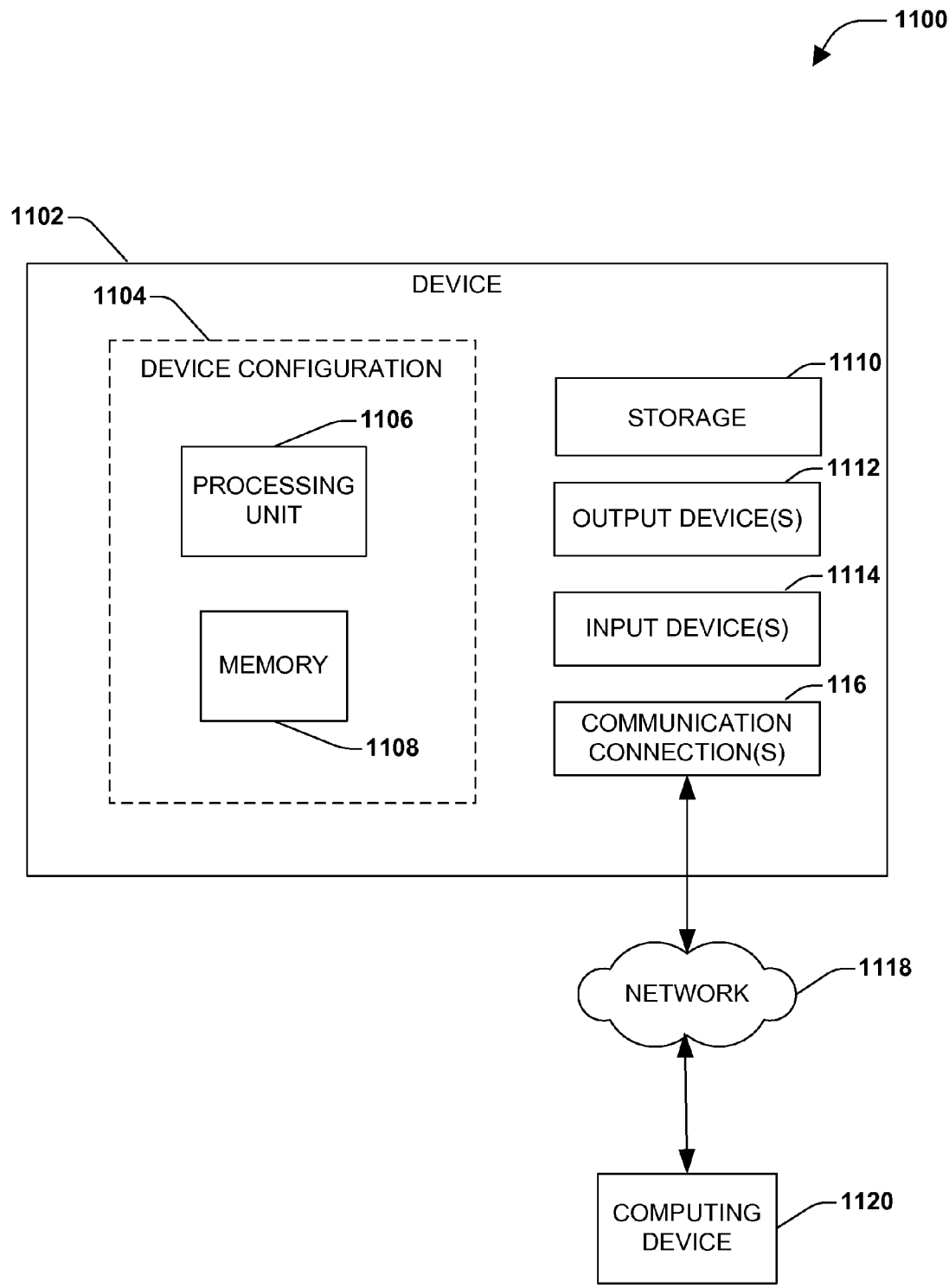
FIG. 11 is an illustration of an exemplary computing environment wherein a portion of the present techniques may be implemented and/or utilized.

FIG. 11 and the following discussion provide a brief, general description of a suitable computing environment to implement embodiments of one or more of the provisions set forth herein. The operating environment of FIG. 11 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 11 illustrates an example of a system 1100 comprising a computing device 1102 configured to implement one or more embodiments provided herein. In one configuration, computing device 1102 includes at least one processing unit 1106 and memory 1108. Depending on the exact configuration and type of computing device, memory 1108 may be volatile (such as RAM, for example), non-volatile (such as ROM, flash memory, etc., for example) or some combination of the two. This configuration is illustrated in FIG. 11 by dashed line 1104.

In other embodiments, device 1102 may include additional features and/or functionality. For example, device 1102 may also include additional storage (e.g., removable and/or non-removable) including, but not limited to, magnetic storage, optical storage, and the like. Such additional storage is illustrated in FIG. 11 by storage 1110. In one embodiment, computer readable instructions to implement one or more embodiments provided herein may be in storage 1110. Storage 1110 may also store other computer readable instructions to implement an operating system, an application program, and the like. Computer readable instructions may be loaded in memory 1108 for execution by processing unit 1106, for example.

The term "computer readable media" as used herein includes computer storage media. Computer storage media includes volatile and nonvolatile, removable and non-removable media implemented in any method or technology for storage of information such as computer readable instructions or other data. Memory 1108 and storage 1110 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1102. Any such computer storage media may be part of device 1102.

Device 1102 may also include communication connection(s) 1116 that allows device 1102 to communicate with other devices. Communication connection(s) 1116 may include, but is not limited to, a modem, a Network Interface Card (NIC), an integrated network interface, a radio frequency transmitter/receiver, an infrared port, a USB connection, or other interfaces for connecting computing device 1102 to other computing devices. Communication connection(s) 1116 may include a wired connection or a wireless connection. Communication connection(s) 1116 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1102 may include input device(s) 1114 such as keyboard, mouse, pen, voice input device, touch input device, infrared cameras, video input devices, and/or any other input device. Output device(s) 1112 such as one or more displays, speakers, printers, and/or any other output device may also be included in device 1102. Input device(s) 1114 and output device(s) 1112 may be connected to device 1102 via a wired connection, wireless connection, or any combination thereof. In one embodiment, an input device or an output device from another computing device may be used as input device(s) 1114 or output device(s) 1112 for computing device 1102.

Components of computing device 1102 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 1102 may be interconnected by a network. For example, memory 1108 may be comprised of multiple physical memory units located in different physical locations interconnected by a network.

Those skilled in the art will realize that storage devices utilized to store computer readable instructions may be distributed across a network. For example, a computing device 1120 accessible via network 1118 may store computer readable instructions to implement one or more embodiments provided herein. Computing device 1102 may access computing device 1120 and download a part or all of the computer readable instructions for execution. Alternatively, computing device 1102 may download pieces of the computer readable instructions, as needed, or some instructions may be executed at computing device 1102 and some at computing device 1120.

G. Use of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of presenting an alert to a user in an environment on a device having a processor, the method comprising: executing on the processor instructions that cause the device to:
    detect a noise level of the environment;
    compare the noise level of the environment to a noise level threshold;
    if the noise level is below the noise level threshold, present the alert to the user; and
    if the noise level is above the noise level threshold, refrain from presenting the alert to the user until the noise level is below the noise level threshold;
    wherein executing the instructions on the processor further causes the device to:
    upon refraining from presenting the alert, store the alert in an alert log;
    store at least one additional alert in the alert log; and
    wherein presenting the alert to the user further comprises:
        consolidating the alerts stored in the alert log;
        presenting the alert log.

2. The method of claim 1, wherein:
    each alert stored in the alert log is associated with an alert priority; and
    presenting the alert log further comprises:
        presenting each alert stored in the alert log sorted descendingly according to the respective alert priority.

3. The method of claim 1, wherein:
    the alert log comprises at least two alerts that are associated with one sender; and
    the consolidating the alerts stored in the alert log further comprises:
        consolidating at least two alerts that are associated with the same sender into one alert.

4. The method of claim 1, wherein:
    the alert comprises a communication request received from a contact; and
    refraining from presenting the alert to the user further comprises:
        notifying the contact that the user is unavailable to accept the communication request due to the noise level of the environment.

5. The method of claim 4, wherein:
    executing the instructions on the processor further causes the device to:
    upon receiving from the user at least two messages respectively deliverable to a contact when the user is unavailable to accept the communication request, store the at least two messages respectively associated with a contact; and
    notifying the contact further comprises: presenting to the contact the at least two messages associated with the contact when the user is unavailable to accept the communication request.

6. The method of claim 4, wherein the notifying the contact further comprises: upon detecting a presentation of the message that is above a notification frequency threshold, refraining from notifying the contact.

7. The method of claim 1, wherein:
    detecting the noise level of the environment further comprises:
        detecting the noise level of the environment at a first time; and
    refraining from presenting the alert to the user further comprises:
        at a second time that is after the first time:
            detecting a second noise level of the environment; and
            comparing the second noise level of the environment to a noise level threshold; and
            if the second noise level at the second time is below the noise level threshold, present the alert to the user at the second time.

8. A method of presenting an alert to a user in an environment on a device having a processor, the method comprising: executing on the processor instructions that cause the device to:
    detect a noise level of the environment;
    compare the noise level of the environment to a noise level threshold;
    if the noise level is below the noise level threshold, present the alert to the user; and
    if the noise level is above the noise level threshold, refrain from presenting the alert to the user until the noise level is below the noise level threshold; wherein:
    the alert is presented in a first sensory modality comprising an audio alert; and
    executing the instructions on the processor further causes the device to, upon refraining from presenting the alert to the user, present an alternative alert in a second sensory modality comprising a vibration alert.

9. A device that presents alerts to a user in an environment, the device comprising:
    an alert memory that, upon receiving an alert, stores the alert;
    a noise level detector that detects a noise level of the environment; and
    an alert presenter that, while the alert memory stores at least one stored alert:
        compares the noise level of the environment to a noise level threshold; and
        upon determining that the noise level of the environment is below the noise level threshold:
            presents the stored alert to the user, and
            removes the stored alert from the alert memory;
    wherein the noise level detector detects the noise level by:
        while the noise level is below the noise level threshold, detecting the noise level at a first period duration; and
        while the noise level is above the noise level threshold, detecting the noise level at a second period duration that is shorter than the first period duration.

10. The device of claim 9, wherein:
    the respective alerts comprise an alert priority; and
    the noise level detector adjusts the second period duration according to the alert priority of the respective stored alerts in the alert memory.

11. The device of claim 9, wherein the noise level detector detects the noise level of the environment only while the alert memory stores at least one stored alert.

12. The device of claim 9, wherein the alert presenter, upon receiving a selected noise level threshold from the user, compares the noise level of the environment with the selected noise level threshold provided by the user.

13. The device of claim 9, further comprising: an alert response monitor that:
- detects a user response of the user to an alert presented in the environment; and
- adjusts the noise level threshold of the device according to the user response of the user to the alert.

14. A computer-readable memory device storing instructions that, when executed on a processor of a device, cause the device to present alerts to a user by:
- detecting a noise level of the environment;
- compare the noise level of the environment to a noise level threshold;
- upon determining that the noise level is below the noise level threshold, present the alert to the user; and
upon determining that the noise level is above the noise level threshold, refrain from presenting the alert to the user until the noise level is below the noise level threshold;
wherein:
- the alert is presented within a frequency range of a frequency spectrum; and
- comparing the noise level of the environment further comprises:
  - identifying a noise level of the environment within the frequency range of the alert; and
  - comparing the noise level with the noise level threshold.

15. The computer-readable memory device of claim 14, wherein:
- the frequency spectrum comprises a vibration frequency spectrum; and
- the alert comprises a vibration alert to be presented to the user within a vibration frequency range;
- comparing the noise level of the environment further comprises:
  - identifying a noise level of the environment within the vibration frequency range of the alert; and
  - comparing the noise level with the noise level threshold.

16. The computer-readable memory device of claim 14, wherein:
- the device comprises an alternative alert presentable to the user at an alternative frequency range of the frequency spectrum that is different from the frequency spectrum of the alert; and
- executing the instructions on the processor further cause the device to, upon determining that the noise level of the environment within the frequency range is above the frequency range of the alert:
  - identify an alternative noise level of the environment within the alternative frequency range of the alternative alert;
  - compare the alternative noise level with the noise level threshold; and
  - upon determining that the alternative noise level is below the noise level threshold, present the alternative alert to the user instead of the alert.

* * * * *